US011656940B2

(12) United States Patent
He et al.

(10) Patent No.: US 11,656,940 B2
(45) Date of Patent: May 23, 2023

(54) TECHNIQUES FOR MANAGING TEMPORARILY RETIRED BLOCKS OF A MEMORY SYSTEM

(71) Applicant: Micron Technology, Inc., Boise, ID (US)

(72) Inventors: Deping He, Boise, ID (US); Chun Sum Yeung, San Jose, CA (US); Jonathan S. Parry, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/574,059

(22) Filed: Jan. 12, 2022

(65) Prior Publication Data
US 2023/0045990 A1 Feb. 16, 2023

Related U.S. Application Data

(60) Provisional application No. 63/232,980, filed on Aug. 13, 2021.

(51) Int. Cl.
*G06F 11/00* (2006.01)
*G06F 11/10* (2006.01)
*G06F 11/07* (2006.01)
*G06F 3/06* (2006.01)

(52) U.S. Cl.
CPC ......... *G06F 11/1068* (2013.01); *G06F 3/064* (2013.01); *G06F 3/0619* (2013.01); *G06F 3/0659* (2013.01); *G06F 3/0679* (2013.01); *G06F 11/076* (2013.01); *G06F 11/0772* (2013.01)

(58) Field of Classification Search
None
See application file for complete search history.

(56) References Cited

U.S. PATENT DOCUMENTS

| 8,516,343 | B2* | 8/2013 | Flynn | G11C 29/88 |
| | | | | 714/773 |
| 9,047,187 | B2* | 6/2015 | Guo | G06F 11/073 |
| 9,443,616 | B2* | 9/2016 | Chen | G11C 29/44 |
| 2011/0099458 | A1* | 4/2011 | Reche | G06F 11/0793 |
| | | | | 714/763 |
| 2011/0302445 | A1* | 12/2011 | Byom | G11C 29/883 |
| | | | | 711/170 |

(Continued)

OTHER PUBLICATIONS

B. Peleato, H. Tabrizi, R. Agarwal and J. Ferreira, "BER-based wear leveling and bad block management for NAND flash," 2015 IEEE International Conference on Communications (ICC), London, UK, 2015, pp. 295-300, doi: 10.1109/ICC.2015.7248337. (Year: 2015).*

*Primary Examiner* — Daniel F. McMahon
(74) *Attorney, Agent, or Firm* — Holland & Hart LLP

(57) ABSTRACT

Methods, systems, and devices for techniques for managing temporarily retired blocks of a memory system are described. In some examples, aspects of a memory system or memory device may be configured to determine an error for a block of memory cells. For example, a controller may determine an existence of the error and may temporarily retire the block. A media management operation may be performed on the temporarily retired block and, depending on one or more characteristics of the error, the temporarily retired block may be enabled or retired.

25 Claims, 5 Drawing Sheets

(56) References Cited

U.S. PATENT DOCUMENTS

| | | | |
|---|---|---|---|
| 2016/0041760 A1* | 2/2016 | Kuang | G11C 16/3495 |
| | | | 711/103 |
| 2017/0160960 A1* | 6/2017 | Camp | G06F 3/0689 |
| 2017/0294237 A1* | 10/2017 | Li | G11C 11/5628 |
| 2019/0065331 A1* | 2/2019 | Singidi | G11C 29/883 |
| 2019/0163592 A1* | 5/2019 | Camp | G06F 3/0688 |
| 2020/0211645 A1* | 7/2020 | McGlaughlin et al. | |
| | | | G06F 3/0659 |
| 2020/0301768 A1* | 9/2020 | Papandreou | G06F 11/076 |

* cited by examiner

TECHNIQUES FOR MANAGING TEMPORARILY RETIRED BLOCKS OF A MEMORY SYSTEM

CROSS REFERENCE

The present application for patent claims priority to U.S. Provisional Patent Application No. 63/232,980 by He et al., entitled "TECHNIQUES FOR MANAGING TEMPORARILY RETIRED BLOCKS OF A MEMORY SYSTEM", filed Aug. 13, 2021, which is assigned to the assignee hereof and is expressly incorporated by reference in its entirety herein.

FIELD OF TECHNOLOGY

The following relates generally to one or more systems for memory and more specifically to techniques for managing temporarily retired blocks of a memory system.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Memory systems may include one or more memory devices that include an array of memory cells and circuitry operable to perform access operations on the memory cells. Various structures of a memory device (e.g., of a memory die) may wear or degrade over time, which may lead to operational failures or otherwise unreliable operation of the memory device. Some memory systems or memory devices may be configured to detect indications of unreliable or failed access operations, and retire portions of a memory array in response to such detections. However, some techniques for detecting unreliable or failed access operations may be overly conservative and lead to excessive retirement of a memory array.

In accordance with examples as disclosed herein, aspects of a memory system or memory device may be configured to determine the occurrence of an error for a block of memory cells. Upon detecting the occurrence of the error, the block may be temporarily retired (e.g., the block may be at least temporarily unavailable to store data). Because some errors may be transient in nature, a media management operation may be performed on the temporarily retired block. The media management operation may include functional testing to determine whether the error is transient because certain conditions will be accounted for. For example, if relatively old data is stored to the block, the block may experience retention problems that would not occur but for the age of the data stored in the block. Additionally or alternatively, the error may be transient due to abnormally high or low operating temperatures of the associated memory system. Thus the testing may control for variations to determine whether the error is transient in nature, and thus correctable.

If an error is determined to be correctable the temporarily retired block may, in some cases, be enabled to store data. However, in some instances, an error may be determined to be uncorrectable and thus the block may be retired (e.g., permanently retired) and thus may no longer used to store data. Compared to other techniques for of array retirement, by implementing one or more aspects of temporarily retiring blocks in accordance with examples as disclosed herein, a memory device may be configured with a larger capacity, a smaller degree of over-provisioning, or a longer life cycle, among other benefits or combinations thereof.

Figure 1:
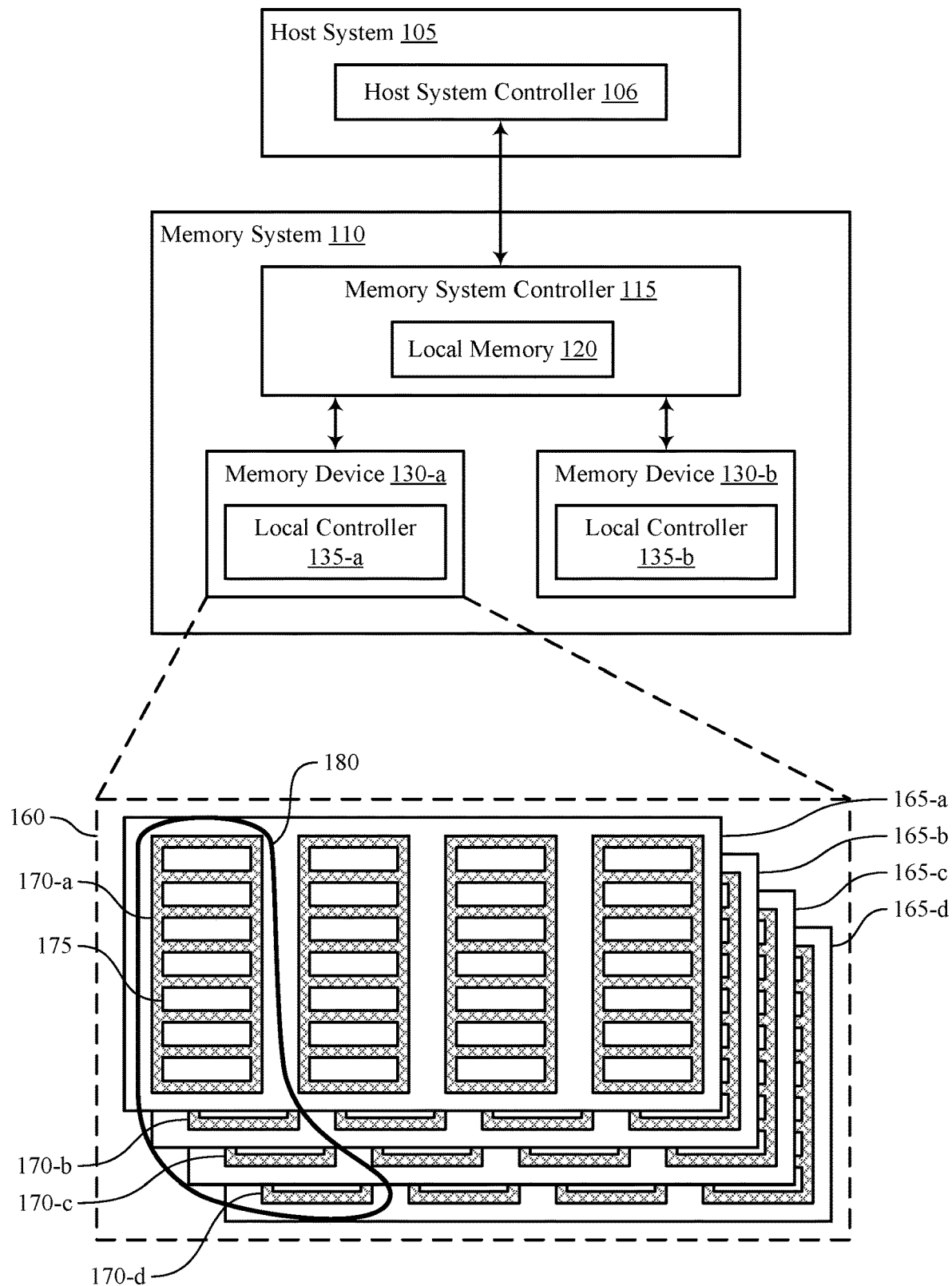
FIG. 1 illustrates an example of a system that supports techniques for managing temporarily retired blocks of a memory system in accordance with examples as disclosed herein.
Figure 2:
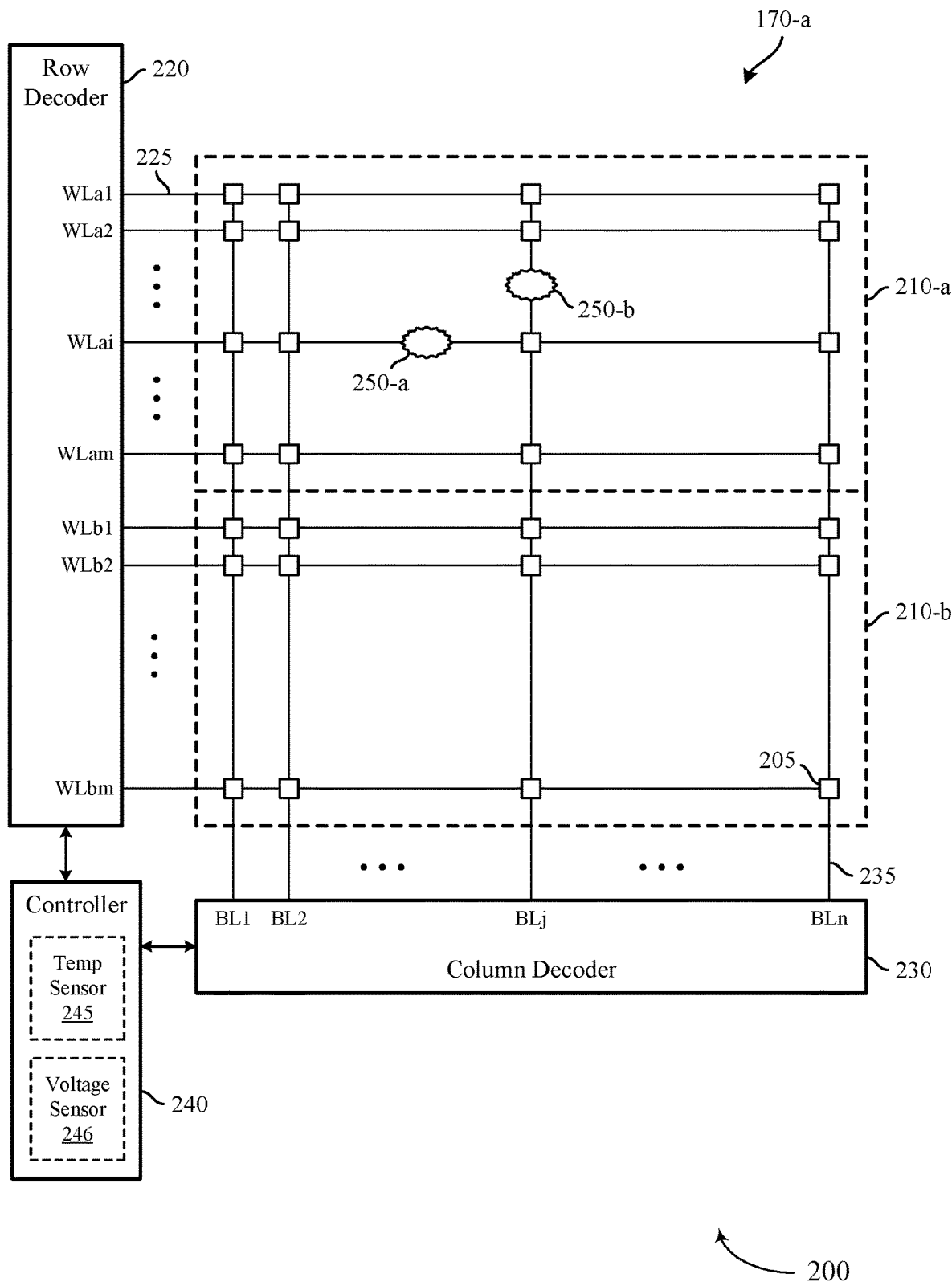
FIG. 2 illustrates an example of a block diagram of a circuit that supports techniques for managing temporarily retired blocks of a memory system in accordance with examples as disclosed herein.

Features of the disclosure are initially described in the context of systems, devices, and circuits with reference to FIGS. 1 and 2. Features of the disclosure are described in the context of a process flow diagram with reference to FIG. 3. These and other features of the disclosure are further illustrated by and described in the context of an apparatus diagram and a flowchart that relate to techniques for managing temporarily retired blocks of a memory system with reference to FIGS. 4 and 5.

FIG. 1 illustrates an example of a system 100 that supports techniques for managing temporarily retired blocks of a memory system in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support techniques for managing temporarily retired blocks of a memory system. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The memory system controller 115 may be configured to determine an occurrence of an error on one or more blocks 170 of memory cells. Upon determining an error on a block 170, the memory system controller 115 may store an index associated with the block 170 to a first mapping (e.g., a first mapping table). As described herein, the first mapping may be associated with one or more temporarily retired blocks 170. Subsequently, the memory system controller 115 may perform a media management operation on the block 170 to determine whether the error is correctable. In some instances, if the error is correctable the index may be transferred to a second mapping, which may effective enable the block 170 (e.g., the block 170 may again be configured to store data). If the error is not correctable, the index may be transferred to a third mapping, which may disable (e.g., permanently disable) the block 170. Accordingly, by temporarily retiring blocks 170, the memory system 110 may be configured with a larger capacity, a smaller degree of over-provisioning, or a longer life cycle, among other benefits.

FIG. 2 illustrates a block diagram of a circuit 200 that supports techniques for managing temporarily retired blocks of a memory system in accordance with examples as disclosed herein. The circuit 200 may be included in a memory system 110, and may include one or more components of a memory device 130. For example, the circuit 200 illustrates an example of a block 170-a including an array of memory cells 205. Each of the memory cells 205 may be located at or otherwise accessible according to an intersection of a word line 225 (e.g., a WL) and a bit line 235 (e.g., a BL), which may each be referred to as access lines of the block 170-a. Memory cells 205 along a word line 225 may be an example of a page 175. The word lines 225 and bit lines 235 may be coupled with a row decoder 220 and a column decoder 230, respectively, for controlling various biasing or activation of the respective access lines. In some examples, the row decoder 220 and the column decoder 230 may be components of a local controller 135, which may support access operations such as writing logic states to memory cells 205 or sensing logic states stored in memory cells 205, among other operations and signaling thereof. The row decoder 220 and the column decoder 230 may be coupled with a controller 240 that is configured to perform various techniques for topology-based retirement as disclosed herein. In various examples, the controller 240 may be included in a memory system controller 115, included in a local controller 135, or distributed between a memory system controller 115 and a local controller 135, among other configurations.

The memory cells 205 may be physically or electrically arranged according to subblocks 210 (e.g., a first subblock 210-a and a second subblock 210-b). In some examples, each of the subblocks 210 may include or refer to a subset of the word lines 225 of a block 170 (e.g., subblock 210-a including or associated with word lines WLa1 through WLam, subblock 210-b including or associated with word lines WLb1 through WLbm). Although the block 170-a is illustrated as including two subblocks 210, a block 170 in accordance with the described techniques may include any quantity of subblocks 210 (e.g., two, three, four, five, six, seven, eight, etc.). Additionally or alternatively, although the subblocks 210 are illustrated as each including a respective subset of the word lines 225 of the block 170-a and all of the bit lines 235 of the block 170-a, in some examples, subblocks 210 may each include a respective subset of the bit lines 235 of a block 170 (e.g., in combination with including some or all of the word lines 225 of the block 170).

In some examples, one or more structures of the circuit 200 (e.g., structures of a die 160) may wear or degrade over time, which may lead to one or more physical defects. For example, circuit 200 illustrates an example of a defect 250-a, which may be associated with at least a word line WLai, and a defect 250-b, which may be associated with at least a bit line BLj. The defects 250 may refer to various degradation or failure of one or more physical elements of the circuit 200. For example, a defect 250 may refer to a short circuit defect or other dielectric breakdown (e.g., a leakage path), such as a short circuit between an access line and a chassis or ground structure of a die 160, a short circuit between an access line and a voltage source (e.g., a positive voltage source, a negative voltage source), a short circuit between a first access line and a second access line (e.g., between a first word line 225 and a second word line 225, between a first bit line 235 and a second bit line 235, between a word line 225 and a bit line 235), or between other structures of the circuit 200. In some examples, a defect 250 may refer to an open circuit defect or other reduction or suppression of conductivity, such as a break in conductivity or a break or other cross-sectional reduction in a conductive path of an access line. The examples of defects 250-*a* and 250-*b* are for illustrative purposes, and a circuit may develop any quantity of one or more defects 250 in various locations of a circuit of a memory device 130, and a defect 150 may affect any quantity of one or more access lines.

In some examples, a defect 250 may cause errors in response to accessing memory cells 205 of the block 170-*a*, which may include uncorrectable errors (e.g., if a quantity of errors exceeds an error correction capability of a memory system 110 or a memory device 130 that includes the circuit 200, if an error is not due to a temporary condition). For example, if the defect 250-*a* is an open circuit defect, the defect 250-*a* may cause errors in response to accessing memory cells 205 along the word line WLai that are downstream of the defect 250-*a* (e.g., downstream relative to the row decoder, farther from the row decoder 220 than the defect 250-*a*) due to signals not being conveyed through the defect 250-*a*). Likewise, if the defect 250-*b* is an open circuit defect, the defect 250-*b* may cause errors in response to accessing memory cells 205 along the bit line BLj that are downstream of the defect 250-*b* (e.g., downstream relative to the column decoder 230, farther from the column decoder 230 than the defect 250-*b*) due to signals not being conveyed through the defect 250-*b*). In examples where a defect 250 is a short circuit, dielectric breakdown, or leakage defect associated with an access line, such a defect 250 may cause errors in response to accessing both memory cells 205 that are downstream of the defect 250 and memory cells 205 that are upstream of the defect 250 (e.g., to voltage instability or charge leakage that generally affects signaling of the access line).

In some examples, the controller 240 may manage one or more mappings for tracking enabled blocks 170, temporarily retired blocks 170, and retired blocks 170 (e.g., permanently retired blocks 170). For example, the controller 240 may maintain tables (e.g., mapping tables) for each of the enabled blocks 170, temporarily retired blocks 170, and retired blocks 170. As used herein, an enabled block 170 may refer to any block 170 that is actively configured to store data. For example, data may be read from or written to an active block 170. A retired block 170 may refer to a block that is no longer configured to be accessed. For example, a block 170 may have experienced one or more errors (e.g., uncorrectable errors, UECC errors) and thus may no longer be able to reliably store data. These blocks 170 may be retired such that data may no longer be read from or written them.

In other examples, the controller 240 may manage any quantity of mappings for tracking the status of blocks 170. For example, blocks 170 that are designated as having one or more errors during factory testing may be stored to a respective mapping. Additionally or alternatively, the controller 240 may manage multiple tables associated with temporarily retired blocks. For example, the controller 240 may manage mapping tables for blocks 170 having experienced different types of errors, such as UECC errors, performance errors (e.g., blocks 170 performing relatively slowly), or blocks being designated as having errors during factory testing.

Temporarily retired blocks 170 may refer to blocks that have experienced one or more errors (e.g., correctable errors) that may be transient in nature. For example, blocks 170 that are storing relatively old data may experience data retention problems that may be identified or corrected during a media management operation. Similarly, some blocks 170 may experience temperature variations (e.g., as measured or detected by a temperature sensor 245) or voltage variations (e.g., as measured or detected by a voltage sensor 246) that may cause temporary (e.g., transient) errors that may not affect the long-term reliability of the block 170. Accordingly, if a block 170 experiences an error, the block 170 may be temporarily retired and may undergo a media management operation to determine whether to enable the block or to retire the block.

In some examples, the controller 240 may determine an occurrence of an error of a block 170-*a* (e.g., an enabled block 170). Upon determining the error, the controller 240 may store an index associated with the block 170-*a* to a first mapping. For example, the controller 240 may store an index that identifies the block 170-*a* to a portion of a first mapping table associated with temporarily retired blocks 170. Accordingly, the block 170-*a* may be at least temporarily unavailable to store data. After storing the index to the first mapping, the controller 240 may perform a media management operation on the block 170-*a*. In some instances, the media management operation may be performed during a duration where the controller 240 (or another portion of an associated memory system) is idle. The media management operation may entail performing functional testing on the block 170-*a*, such as writing data (e.g., new data) to the block 170-*a* and subsequently reading the data from the block 170-*a*, to determine whether the error is correctable.

In some examples, media management operations may be performed on temporarily retired blocks such that retirement evaluations may be conditional or otherwise modified based on an evaluation or detection of operating conditions, such as observations of temperature, voltage, or other conditions that may affect operation of a memory system 110 or memory device 130. For example, elevated operating temperatures may be associated with increased occurrence of access errors (e.g., appearing as a relatively substantial, localized failure), but occurrence of such access errors may decrease as operating temperatures are within a more normal range of temperatures. Thus, temporarily retiring a block 170 may allow for less-frequent retirement of blocks 170. That is, performing testing to determine whether an error is transient in nature may result in fewer blocks 170 being retired due to operating under elevated temperatures. Accordingly, some examples of the media management operations described herein may reduce a quantity of blocks 170 that would otherwise be retired due to transient effects that may have induced observed errors.

In some instances, the controller 240 may determine that the error associated with the block 170-*a* is correctable or transient based on performing the one or more media management operations on the temporarily retired block. In such instances, the controller 240 may correct the error and may transfer the index from the first mapping to a second mapping (e.g., the controller 240 may enable the block 170-*a*). In other examples, as described below with reference to FIG. 3, the controller 240 may increment a counter associated with the block 170-*a* based on correcting the error, and may determine whether to enable or retire the block 170-*a* based on a value of the counter. The counter may track a quantity of times that a specific block has been retired. In some cases, some blocks may be more sensitive to changes in some operating conditions and may therefore fail and be temporarily retired more often than other blocks. In such cases, the media management operation may indicate that the temporarily retired block could be made active again, but the block may be permanent retired based on the counter satisfying a threshold.

In other examples, the controller 240 may determine that the error associated with the block 170-*a* is uncorrectable. In such instances, the controller 240 may transfer the index from the first mapping to a third mapping (e.g., the controller 240 may retire the block 170-a). In other examples, as described below with reference to FIG. 3, the controller 240 may determine a type of the error (e.g., a type of the uncorrectable error) and may adjust one or more criteria for subsequently retiring blocks 170. By implementing a block 170 retirement scheme that utilizes temporarily retired blocks, memory systems 110 may perform testing to determine whether an error is transient in nature. By correcting such transient errors and enabling the associated blocks 170, fewer blocks 170 may be prematurely permanently retired due to operating under elevated temperatures or otherwise adverse operating conditions. Accordingly, a memory system 110 may be configured with a larger capacity, a smaller degree of over-provisioning, or a longer life cycle, among other benefits.

Figure 3:
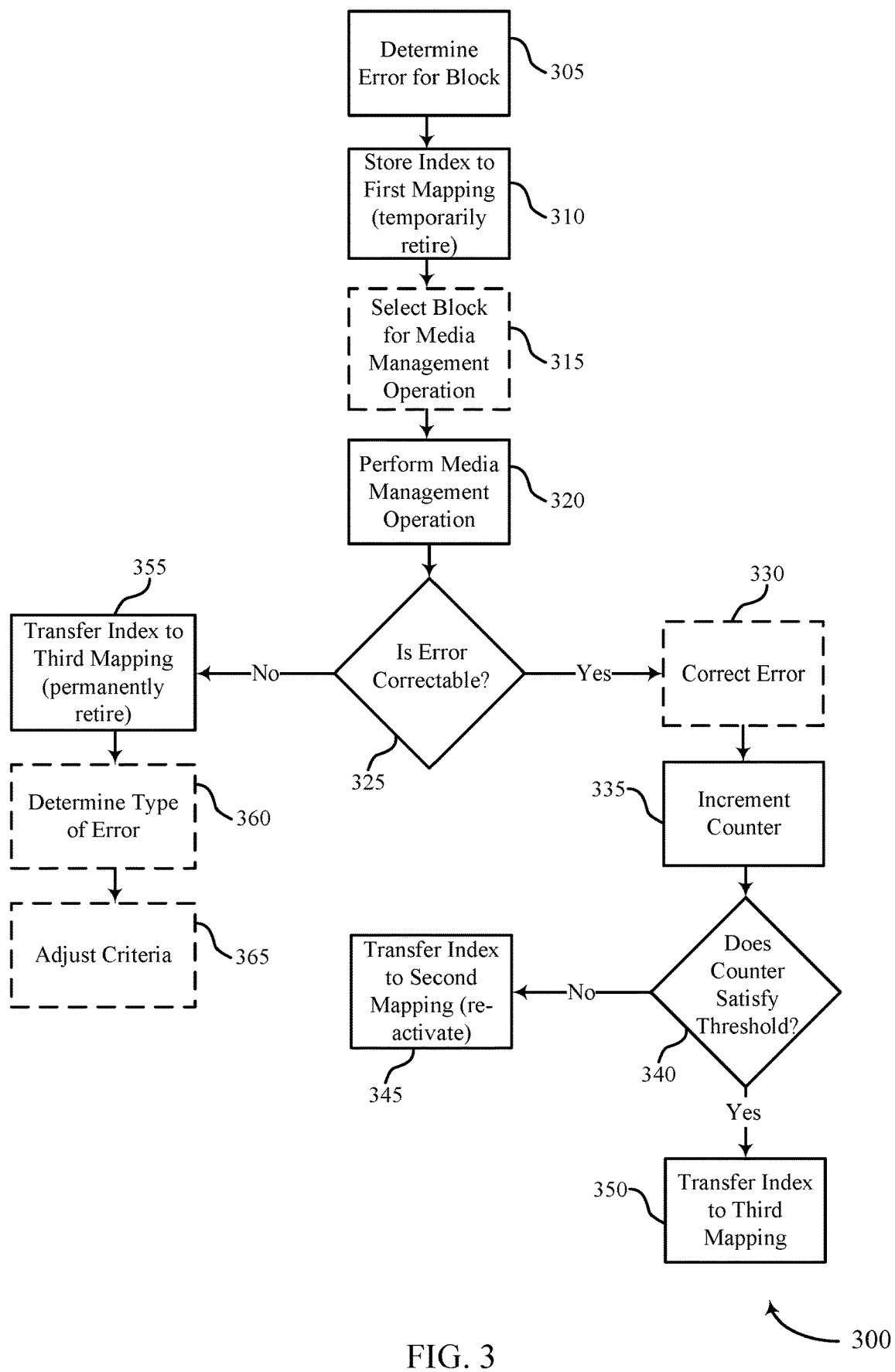
FIG. 3 illustrates an example of a process flow diagram that supports techniques for managing temporarily retired blocks of a memory system in accordance with examples as disclosed herein.

FIG. 3 illustrates an example of a process flow diagram illustrating a method 300 that supports techniques for managing temporarily retired blocks of a memory system in accordance with examples as disclosed herein. Aspects of the method 300 may be implemented by a controller (e.g., a memory system controller 115, a local controller 135, a controller 240), among other components. Additionally or alternatively, aspects of the method 300 may be implemented as instructions stored in memory (e.g., firmware stored in a memory coupled with a memory system 110 or a memory device 130). For example, the instructions, if executed by a controller, may cause the controller to perform the operations of the method 300.

In some examples, the method 300 may begin (e.g., be initiated) at 305 based on the determination of an error for a block 170-a. For example, the method 300 may begin after a controller 240 determines an error condition, such as a read error (e.g., of the block 170-a), which may be determined during the course of normal operations (e.g., during a read operation performed in response to a read command from a host system 105), media management operations (e.g., a garbage collection operation, a wear leveling operation), or other operations.

At 310, an index associated with the block 170-a may be stored to a first mapping. As described herein, an index may be utilized to identify a particular block 170 and a first mapping (e.g., a first mapping table) may store indices associated with one or more temporarily retired blocks. For example, a controller 240 may manage or have access to a first mapping table and may store the index associated with the block 170-a to the table. In some instances, storing the index to the first mapping may result in the block 170-a being temporarily retired and thus the block 170-a may be at least temporarily unavailable to store data.

At 315, the block 170-a may be selected for a media management operation. In some instances, after a block 170 is temporarily retired (e.g., after an index is stored to the first mapping), a media management operation may not be performed on the block 170 right away. Instead, other types of media management operations (e.g., garbage collection operations, wear leveling operations, etc.) may be performed on other blocks 170 first. In some instances, the block 170-a may be selected for a media management operation based on an associated identifier. For example, some blocks 170 may be associated with identifiers for indicating that a garbage collection is to be performed, while the block 170-a may be associated with an identifier for indicating that functional testing is to be performed in order to determine whether to enable the block 170-a or retire the block 170-a.

In some instances, media management operations such as garbage collection or wear leveling may take precedent over functional testing, thus the block 170-a may be selected for a media management operation during a duration that the associated memory system 110 (or a portion of the memory system 110) is idle. In other example, the block 170-a may be selected for the media management operation based on a quantity of available (e.g., enabled) blocks. For example, if a relatively large quantity of blocks 170 are available, it may be more desirable to utilize one or more of the available blocks 170. Conversely, if relatively few blocks 170 are available, it may be more desirable to attempt to enable the block 170-a by performing a media management operation on the block 170-a.

At 320, a media management operation may be performed on the block 170-a. As described herein, the media management operation may entail performing functional testing on the block 170-a, such as writing data (e.g., new data) to the block 170-a and subsequently reading the data from the block 170-a, to determine whether the error that was identified earlier (e.g., the error that caused the block to be temporarily retired) is transient or correctable. In some cases, errors that were identified in response to the temporarily retired block actively storing data may not exist as part of performing the media management operation (e.g., some operating conditions or combinations of operating conditions may not exist during the media management operation). Such transient errors may be byproducts of operating conditions and the underlying block of memory cells may continue to usable to store data from the host system. The testing performed during the media management operation at 320 may be able to determine whether the error is transient because some conditions may be accounted for or controlled during the media management operation. For example, if relatively old data is stored to the block 170-a, the block 170-a may experience retention problems that would not occur but for the age of the data. Additionally or alternatively, the error may be transient due to abnormally high or low operating temperatures of the memory system 110 that existed as part of the data being written to the block or read from the block. Thus, the testing may control for operating conditions (e.g., temperature variations) to determine whether the error is transient in nature, and thus correctable.

At 325, the controller 240 may determine whether the error is correctable based on the media management operation performed at 320. Depending on whether the error is correctable, the controller 240 may enable the block 170-a (e.g., the controller 240 may transfer the index from the first mapping to a second mapping) or may retire the block 170-a (e.g., the controller 240 may transfer the index from the first mapping to a third mapping).

At 330, the controller 240 may correct the error of the block 170-a based on the error being correctable. In some instances, correcting the error may entail writing (e.g., rewriting) data to the block 170-a based on the error being transient in nature. In other examples, the memory system 110 may include one or more error correction code (ECC) blocks configured to correct the error of the block 170-a. After the error is corrected, the index associated with the block 170-a may be transferred from the first mapping to a second mapping, which may result in the block 170-a being enabled. In some cases, the earlier-identified error may be transient in nature, so no active correction of any error may be done on the block.

At 335, a counter associated with the block 170-a may be incremented. In some examples, the controller 240 may track a quantity of errors of each block 170 that are corrected. In some instances, counters may be implemented because a block 170 may experience a threshold quantity of errors before data retention becomes less reliable. That is, after experiencing a threshold quantity of correctable errors, a block 170 may be more susceptible to experiencing an uncorrectable error or may otherwise be less reliable.

Accordingly, despite a block 170 experiencing a correctable error, the block 170 may still be retired based on a value of the counter. In some examples, the controller 240 may track a quantity of times that the specific block has been temporarily retired. Some blocks may be more sensitive to some combinations of operating conditions, that may result in some errors. If a block is repeatedly being temporarily retired, but then re-activated after performing the media management operations, the controller 240 may permanently retire that block if the counter satisfies a threshold.

At 340, the controller 240 may determine whether the value of the counter satisfies a threshold value. In some instances, the controller 240 may determine whether the value satisfies the threshold value within a threshold duration. The threshold value and threshold duration may each be programmable values (e.g., a configurable values) that may be set by a host system 105 or may be set based on one or more trim settings. At 345, if the value of the counter associated with the block 170-*a* does not satisfy the threshold value (e.g., if the block 170-*a* has experienced relatively few correctable errors or has been temporarily retired relatively few times), the index associated with the block 170-*a* may be transferred to a second mapping, which may result in the block being enabled or reactivated. In other examples, at 350, if the value of the counter associated with the block 170-*a* satisfies the threshold value (e.g., if the block 170-*a* has experienced a relatively large quantity of correctable errors or has been temporarily retired relatively many times), the index associated with the block 170-*a* may be transferred to a third mapping, which may result in the block being retired (e.g., permanently retired).

At 355, the controller 240 may transfer the index associated with the block 170-*a* to a third mapping based on the error being uncorrectable. Examples of uncorrectable errors may be a UECC error, or an uncorrectable read error. By transferring the index to the third mapping, the block 170-*a* may be retired (e.g., permanently retired) and thus may be unavailable for use in future operations.

At 360, the controller 240 may determine a type of the uncorrectable error. At 365, the controller 240 may adjust one or more criteria for retiring blocks 170 during future media management operations. For example, threshold values or threshold durations associated with respective counters may be changed based on a type of error that results in a block 170 being retired. By determining a type of error that results in a block 170 being retired, the controller 240 may be able to enable or retire blocks 170 more efficiently.

Figure 4:
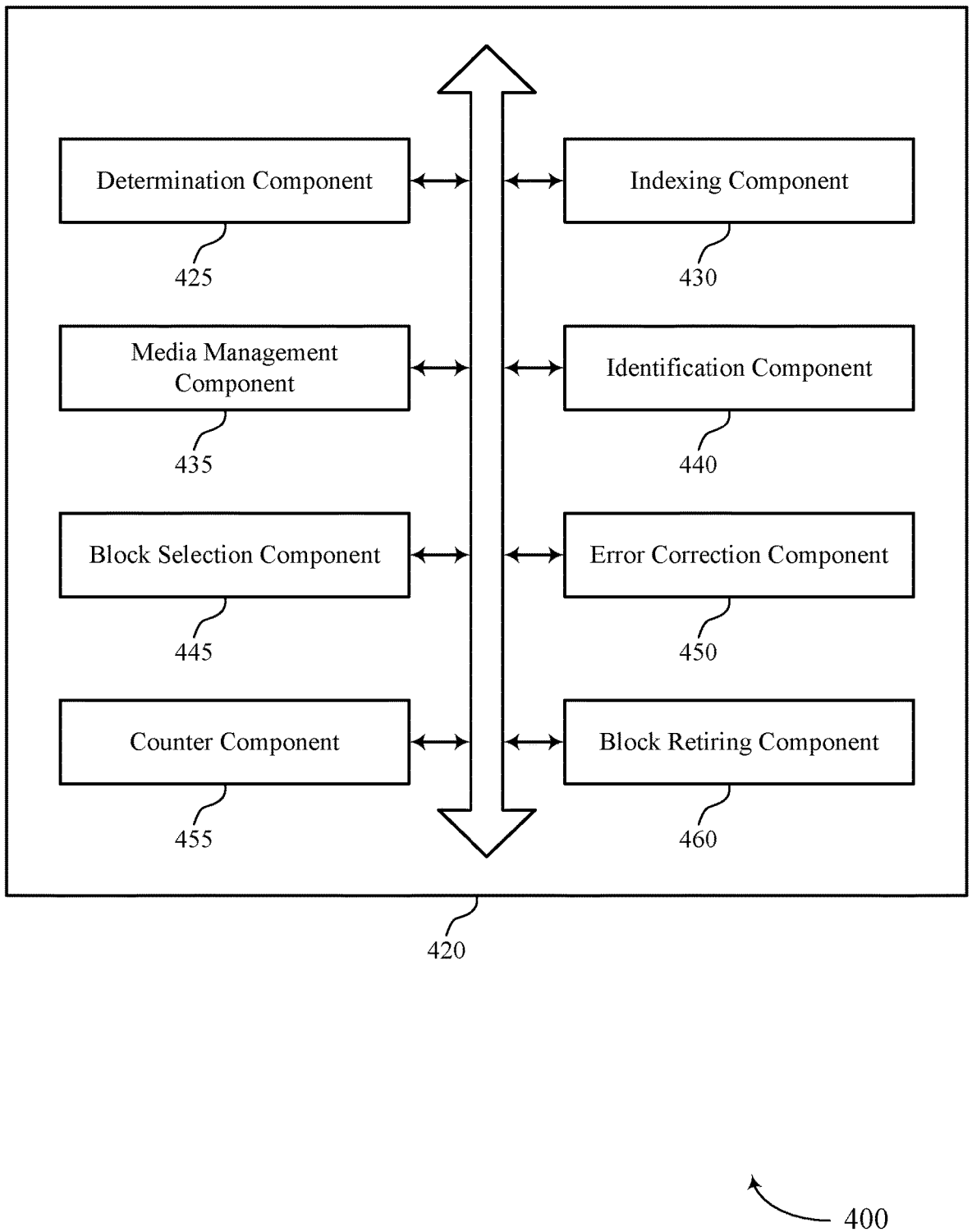
FIG. 4 shows a block diagram of a memory system that supports techniques for managing temporarily retired blocks of a memory system in accordance with examples as disclosed herein.

FIG. 4 shows a block diagram 400 of a memory system 420 that supports techniques for managing temporarily retired blocks of a memory system in accordance with examples as disclosed herein. The memory system 420 may be an example of aspects of a memory system as described with reference to FIGS. 1 through 3. The memory system 420, or various components thereof, may be an example of means for performing various aspects of techniques for managing temporarily retired blocks of a memory system as described herein. For example, the memory system 420 may include a determination component 425, an indexing component 430, a media management component 435, an identification component 440, a block selection component 445, an error correction component 450, a counter component 455, a block retiring component 460, or any combination thereof. Each of these components may communicate, directly or indirectly, with one another (e.g., via one or more buses).

The determination component 425 may be configured as or otherwise support a means for determining an occurrence of at least one error for a block of memory cells of the memory system. In some examples, the determination component 425 may be configured as or otherwise support a means for determining whether to retire the block or enable the block based at least in part on performing the media management operation on the block of memory cells associated with the index that is stored to the first mapping that indicates the one or more temporarily retired blocks of memory cells of the memory system.

In some examples, the determination component 425 may be configured as or otherwise support a means for determining that the at least one error for the block of memory cells is correctable based at least in part on performing the media management operation on the block of memory cells. In some examples, the determination component 425 may be configured as or otherwise support a means for determining whether to retire the block of memory cells or enable the block of memory cells based at least in part on performing the second media management operation on the block of memory cells.

In some examples, the determination component 425 may be configured as or otherwise support a means for determining that the at least one error for the block of memory cells is uncorrectable based at least in part on performing the media management operation on the block of memory cells. In some examples, the determination component 425 may be configured as or otherwise support a means for determining a type of the at least one error for the block of memory cells based at least in part on determining that the at least one error for the block of memory cells is uncorrectable.

The indexing component 430 may be configured as or otherwise support a means for storing an index associated with the block of memory cells to a first mapping that indicates one or more temporarily retired blocks of memory cells of the memory system. In some examples, the indexing component 430 may be configured as or otherwise support a means for transferring the index to a different mapping based at least in part on determining whether to retire or enable the block.

In some examples, the indexing component 430 may be configured as or otherwise support a means for transferring the index to a second mapping that indicates one or more enabled blocks of memory cells of the memory system that are available to replace other blocks of memory cells of the memory system based at least in part on determining that the at least one error for the block of memory cells is correctable. In some examples, the indexing component 430 may be configured as or otherwise support a means for transferring the index from the first mapping to a third mapping that indicates one or more permanently retired blocks of memory cells of the memory system based at least in part on based at least in part on the value of the counter satisfying a threshold value.

In some examples, the indexing component 430 may be configured as or otherwise support a means for transferring the index from the second mapping to the first mapping based at least in part on identifying the second error for the block of memory cells. In some examples, the indexing component 430 may be configured as or otherwise support a means for transferring the index to a third mapping that indicates one or more permanently retired blocks of memory cells of the memory system based at least in part on determining that the at least one error for the block of memory cells is uncorrectable. In some examples, the indexing component 430 may be configured as or otherwise support a means for adjusting one or more criteria for storing a second index associated with a second block of memory cells of the memory system to the first mapping based at least in part on determining the type of the at least one error for the block of memory cells.

The media management component 435 may be configured as or otherwise support a means for performing a media management operation on the block of memory cells based at least in part on storing the index to the first mapping. In some examples, the media management component 435 may be configured as or otherwise support a means for performing a second media management operation on the block of memory cells based at least in part on transferring the index from the second mapping to the first mapping.

In some examples, the identification component 440 may be configured as or otherwise support a means for identifying a second error for the block of memory cells after transferring the index to the second mapping that indicates the one or more enabled blocks of memory cells of the memory system. In some examples, the identification component 440 may be configured as or otherwise support a means for identifying a plurality of blocks of memory cells of the memory system, where each block is associated with a respective identifier of a plurality of identifiers.

In some examples, the block selection component 445 may be configured as or otherwise support a means for selecting the block of memory cells based at least in part on the respective identifier associated with the block of memory cells, where performing the media management operation on the block is based at least in part on selecting the block.

In some examples, the error correction component 450 may be configured as or otherwise support a means for correcting the at least one error for the block of memory cells as part of the media management operation and based at least in part on determining that the at least one error for the block of memory cells is correctable, where transferring the index to the second mapping is based at least in part on correcting the at least one error.

In some examples, the counter component 455 may be configured as or otherwise support a means for incrementing a counter associated with the block of memory cells based at least in part on determining that the at least one error for the block of memory cells is correctable, where the block of memory cells is configured to be retired or enabled for a second time based at least in part on a value of the counter.

In some examples, the block retiring component 460 may be configured as or otherwise support a means for retiring, permanently, the block of memory cells based at least in part on the value of the counter satisfying a threshold value.

In some examples, determining whether to retire the block of memory cells is based at least in part on a value of a counter associated with the block of memory cells. In some examples, performing the media management operation on the temporarily retired block of memory cells occurs during at least a portion of an idle duration associated with the memory system.

Figure 5:
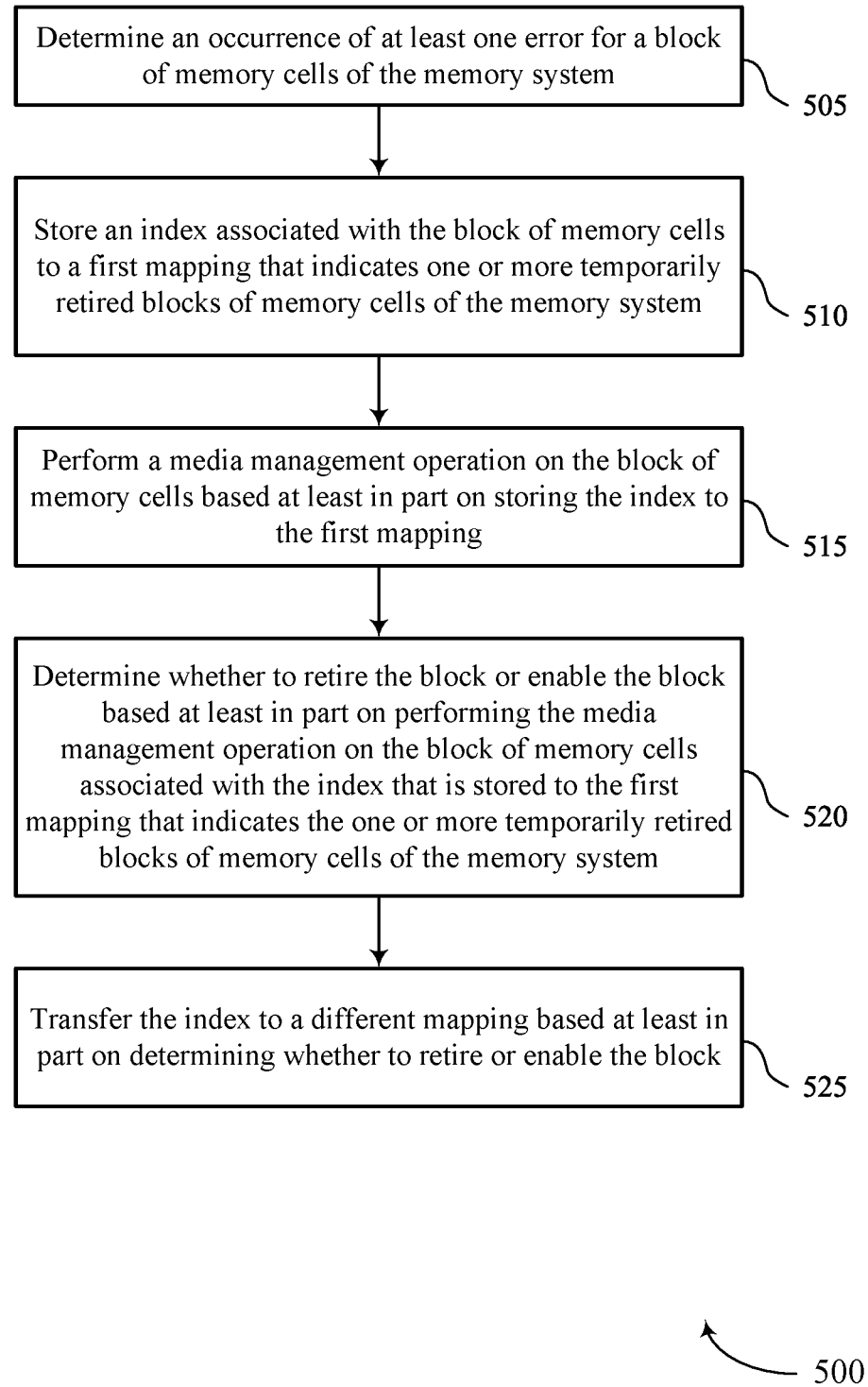
FIG. 5 shows a flowchart illustrating a method or methods that support techniques for managing temporarily retired blocks of a memory system in accordance with examples as disclosed herein.

FIG. 5 shows a flowchart illustrating a method 500 that supports techniques for managing temporarily retired blocks of a memory system in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally or alternatively, the memory system may perform aspects of the described functions using special-purpose hardware.

At 505, the method may include determining an occurrence of at least one error for a block of memory cells of the memory system. The operations of 505 may be performed in accordance with examples as disclosed herein. In some examples, aspects of the operations of 505 may be performed by a determination component 425 as described with reference to FIG. 4.

At 510, the method may include storing an index associated with the block of memory cells to a first mapping that indicates one or more temporarily retired blocks of memory cells of the memory system. The operations of 510 may be performed in accordance with examples as disclosed herein. In some examples, aspects of the operations of 510 may be performed by an indexing component 430 as described with reference to FIG. 4.

At 515, the method may include performing a media management operation on the block of memory cells based at least in part on storing the index to the first mapping. The operations of 515 may be performed in accordance with examples as disclosed herein. In some examples, aspects of the operations of 515 may be performed by a media management component 435 as described with reference to FIG. 4.

At 520, the method may include determining whether to retire the block or enable the block based at least in part on performing the media management operation on the block of memory cells associated with the index that is stored to the first mapping that indicates the one or more temporarily retired blocks of memory cells of the memory system. The operations of 520 may be performed in accordance with examples as disclosed herein. In some examples, aspects of the operations of 520 may be performed by a determination component 425 as described with reference to FIG. 4.

At 525, the method may include transferring the index to a different mapping based at least in part on determining whether to retire or enable the block. The operations of 525 may be performed in accordance with examples as disclosed herein. In some examples, aspects of the operations of 525 may be performed by an indexing component 430 as described with reference to FIG. 4.

In some examples, an apparatus as described herein may perform a method or methods, such as the method 500. The apparatus may include, features, circuitry, logic, means, or instructions (e.g., a non-transitory computer-readable medium storing instructions executable by a processor) for determining an occurrence of at least one error for a block of memory cells of the memory system, storing an index associated with the block of memory cells to a first mapping that indicates one or more temporarily retired blocks of memory cells of the memory system, performing a media management operation on the block of memory cells based at least in part on storing the index to the first mapping, determining whether to retire the block or enable the block based at least in part on performing the media management operation on the block of memory cells associated with the index that is stored to the first mapping that indicates the one or more temporarily retired blocks of memory cells of the memory system, and transferring the index to a different mapping based at least in part on determining whether to retire or enable the block.

Some examples of the method 500 and the apparatus described herein may further include operations, features, circuitry, logic, means, or instructions for determining that the at least one error for the block of memory cells may be correctable based at least in part on performing the media management operation on the block of memory cells and transferring the index to a second mapping that indicates one or more enabled blocks of memory cells of the memory system that may be available to replace other blocks of memory cells of the memory system based at least in part on determining that the at least one error for the block of memory cells may be correctable.

Some examples of the method 500 and the apparatus described herein may further include operations, features, circuitry, logic, means, or instructions for correcting the at least one error for the block of memory cells as part of the media management operation and based at least in part on determining that the at least one error for the block of memory cells may be correctable, where transferring the index to the second mapping may be based at least in part on correcting the at least one error.

Some examples of the method 500 and the apparatus described herein may further include operations, features, circuitry, logic, means, or instructions for incrementing a counter associated with the block of memory cells based at least in part on determining that the at least one error for the block of memory cells may be correctable, where the block of memory cells may be configured to be retired or enabled for a second time based at least in part on a value of the counter.

Some examples of the method 500 and the apparatus described herein may further include operations, features, circuitry, logic, means, or instructions for transferring the index from the first mapping to a third mapping that indicates one or more permanently retired blocks of memory cells of the memory system based at least in part on based at least in part on the value of the counter satisfying a threshold value.

Some examples of the method 500 and the apparatus described herein may further include operations, features, circuitry, logic, means, or instructions for identifying a second error for the block of memory cells after transferring the index to the second mapping that indicates the one or more enabled blocks of memory cells of the memory system, transferring the index from the second mapping to the first mapping based at least in part on identifying the second error for the block of memory cells, performing a second media management operation on the block of memory cells based at least in part on transferring the index from the second mapping to the first mapping, and determining whether to retire the block of memory cells or enable the block of memory cells based at least in part on performing the second media management operation on the block of memory cells.

Some examples of the method 500 and the apparatus described herein may further include operations, features, circuitry, logic, means, or instructions for determining whether to retire the block of memory cells may be based at least in part on a value of a counter associated with the block of memory cells.

Some examples of the method 500 and the apparatus described herein may further include operations, features, circuitry, logic, means, or instructions for retiring, permanently, the block of memory cells based at least in part on the value of the counter satisfying a threshold value.

Some examples of the method 500 and the apparatus described herein may further include operations, features, circuitry, logic, means, or instructions for determining that the at least one error for the block of memory cells may be uncorrectable based at least in part on performing the media management operation on the block of memory cells and transferring the index to a third mapping that indicates one or more permanently retired blocks of memory cells of the memory system based at least in part on determining that the at least one error for the block of memory cells may be uncorrectable.

Some examples of the method 500 and the apparatus described herein may further include operations, features, circuitry, logic, means, or instructions for determining a type of the at least one error for the block of memory cells based at least in part on determining that the at least one error for the block of memory cells may be uncorrectable and adjusting one or more criteria for storing a second index associated with a second block of memory cells of the memory system to the first mapping based at least in part on determining the type of the at least one error for the block of memory cells.

Some examples of the method 500 and the apparatus described herein may further include operations, features, circuitry, logic, means, or instructions for identifying a plurality of blocks of memory cells of the memory system, where each block may be associated with a respective identifier of a plurality of identifiers and selecting the block of memory cells based at least in part on the respective identifier associated with the block of memory cells, where performing the media management operation on the block may be based at least in part on selecting the block.

Some examples of the method 500 and the apparatus described herein may further include operations, features, circuitry, logic, means, or instructions for performing the media management operation on the temporarily retired block of memory cells occurs during at least a portion of an idle duration associated with the memory system.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
   a memory device comprising a block of memory cells; and
   a controller coupled with the memory device and configured to cause the apparatus to:
   determine an occurrence of at least one error for the block of memory cells;
   store an index associated with the block of memory cells to a first mapping that indicates one or more temporarily retired blocks of memory cells;
   perform a media management operation on the block of memory cells based at least in part on storing the index to the first mapping;
   determine whether to retire the block or enable the block based at least in part on performing the media management operation on the block of memory cells associated with the index that is stored to the first mapping that indicates the one or more temporarily retired blocks of memory cells; and
   transfer the index to a different mapping based at least in part on determining whether to retire or enable the block.

2. The apparatus of claim 1, wherein the controller is configured to cause the apparatus to:
   determine that the at least one error for the block of memory cells is correctable based at least in part on performing the media management operation on the block of memory cells; and
   transfer the index to a second mapping that indicates one or more enabled blocks of memory cells that are available to replace other blocks of memory cells based at least in part on determining that the at least one error for the block of memory cells is correctable.

3. The apparatus of claim 2, wherein the controller is configured to cause the apparatus to:
   correct the at least one error for the block of memory cells as part of the media management operation and based at least in part on determining that the at least one error for the block of memory cells is correctable, wherein transferring the index to the second mapping is based at least in part on correcting the at least one error.

4. The apparatus of claim 2, wherein the controller is configured to cause the apparatus to:
   increment a counter associated with the block of memory cells based at least in part on determining that the at least one error for the block of memory cells is correctable, wherein the block of memory cells is configured to be retired or enabled for a second time based at least in part on a value of the counter.

5. The apparatus of claim 4, wherein the controller is configured to cause the apparatus to:
   transfer the index from the first mapping to a third mapping that indicates one or more permanently retired blocks of memory cells based at least in part on based at least in part on the value of the counter satisfying a threshold value.

6. The apparatus of claim 2, wherein the controller is configured to cause the apparatus to:
   identify a second error for the block of memory cells after transferring the index to the second mapping that indicates the one or more enabled blocks of memory cells;
   transfer the index from the second mapping to the first mapping based at least in part on identifying the second error for the block of memory cells;
   perform a second media management operation on the block of memory cells based at least in part on transferring the index from the second mapping to the first mapping; and determine whether to retire the block of memory cells or enable the block of memory cells based at least in part on performing the second media management operation on the block of memory cells.

7. The apparatus of claim 6, wherein determining whether to retire the block of memory cells is based at least in part on a value of a counter associated with the block of memory cells.

8. The apparatus of claim 7, wherein the controller is configured to cause the apparatus to:
retire, permanently, the block of memory cells based at least in part on the value of the counter satisfying a threshold value.

9. The apparatus of claim 1, wherein the controller is configured to cause the apparatus to:
determine that the at least one error for the block of memory cells is uncorrectable based at least in part on performing the media management operation on the block of memory cells; and
transfer the index to a third mapping that indicates one or more permanently retired blocks of memory cells based at least in part on determining that the at least one error for the block of memory cells is uncorrectable.

10. The apparatus of claim 9, further comprising:
a second block of memory cells, wherein the controller is configured to cause the apparatus to:
determine a type of the at least one error for the block of memory cells based at least in part on determining that the at least one error for the block of memory cells is uncorrectable; and
adjust one or more criteria for storing a second index associated with the second block of memory cells to the first mapping based at least in part on determining the type of the at least one error for the block of memory cells.

11. The apparatus of claim 1, wherein the controller is configured to cause the apparatus to:
identify a plurality of blocks of memory cells, wherein each block is associated with a respective identifier of a plurality of identifiers; and
select the block of memory cells based at least in part on the respective identifier associated with the block of memory cells, wherein performing the media management operation on the block is based at least in part on selecting the block.

12. The apparatus of claim 1, wherein performing the media management operation on the temporarily retired block of memory cells occurs during at least a portion of an idle duration associated with the memory device.

13. A non-transitory computer-readable medium storing code comprising instructions which, when executed by a processor of an electronic device, cause the electronic device to:
determine an occurrence of at least one error for a block of memory cells of a memory system;
store an index associated with the block of memory cells to a first mapping that indicates one or more temporarily retired blocks of memory cells of the memory system;
perform a media management operation on the block of memory cells based at least in part on storing the index to the first mapping;
determine whether to retire the block or enable the block based at least in part on performing the media management operation on the block of memory cells associated with the index that is stored to the first mapping that indicates the one or more temporarily retired blocks of memory cells of the memory system; and
transfer the index to a different mapping based at least in part on determining whether to retire or enable the block.

14. The non-transitory computer-readable medium of claim 13, wherein the instructions, when executed by the processor of the electronic device, cause the electronic device to:
determine that the at least one error for the block of memory cells is correctable based at least in part on performing the media management operation on the block of memory cells; and
transfer the index to a second mapping that indicates one or more enabled blocks of memory cells of the memory system that are available to replace other blocks of memory cells of the memory system based at least in part on determining that the at least one error for the block of memory cells is correctable.

15. The non-transitory computer-readable medium of claim 14, wherein the instructions, when executed by the processor of the electronic device, cause the electronic device to:
correct the at least one error for the block of memory cells as part of the media management operation and based at least in part on determining that the at least one error for the block of memory cells is correctable, wherein transferring the index to the second mapping is based at least in part on correcting the at least one error.

16. The non-transitory computer-readable medium of claim 14, wherein the instructions, when executed by the processor of the electronic device, cause the electronic device to:
increment a counter associated with the block of memory cells based at least in part on determining that the at least one error for the block of memory cells is correctable, wherein the block of memory cells is configured to be retired or enabled for a second time based at least in part on a value of the counter.

17. The non-transitory computer-readable medium of claim 16, wherein the instructions, when executed by the processor of the electronic device, cause the electronic device to:
transfer the index from the first mapping to a third mapping that indicates one or more permanently retired blocks of memory cells of the memory system based at least in part on based at least in part on the value of the counter satisfying a threshold value.

18. The non-transitory computer-readable medium of claim 14, wherein the instructions, when executed by the processor of the electronic device, cause the electronic device to:
identify a second error for the block of memory cells after transferring the index to the second mapping that indicates the one or more enabled blocks of memory cells of the memory system;
transfer the index from the second mapping to the first mapping based at least in part on identifying the second error for the block of memory cells;
perform a second media management operation on the block of memory cells based at least in part on transferring the index from the second mapping to the first mapping; and
determine whether to retire the block of memory cells or enable the block of memory cells based at least in part on performing the second media management operation on the block of memory cells.

19. The non-transitory computer-readable medium of claim 18, wherein determining whether to retire the block of memory cells is based at least in part on a value of a counter associated with the block of memory cells.

20. The non-transitory computer-readable medium of claim 19, wherein the instructions, when executed by the processor of the electronic device, cause the electronic device to:
retire, permanently, the block of memory cells based at least in part on the value of the counter satisfying a threshold value.

21. The non-transitory computer-readable medium of claim 13, wherein the instructions, when executed by the processor of the electronic device, cause the electronic device to:
determine that the at least one error for the block of memory cells is uncorrectable based at least in part on performing the media management operation on the block of memory cells; and
transfer the index to a third mapping that indicates one or more permanently retired blocks of memory cells of the memory system based at least in part on determining that the at least one error for the block of memory cells is uncorrectable.

22. The non-transitory computer-readable medium of claim 21, wherein the instructions, when executed by the processor of the electronic device, cause the electronic device to:
determine a type of the at least one error for the block of memory cells based at least in part on determining that the at least one error for the block of memory cells is uncorrectable; and
adjust one or more criteria for storing a second index associated with a second block of memory cells of the memory system to the first mapping based at least in part on determining the type of the at least one error for the block of memory cells.

23. The non-transitory computer-readable medium of claim 13, wherein the instructions, when executed by the processor of the electronic device, cause the electronic device to:
identify a plurality of blocks of memory cells of the memory system, wherein each block is associated with a respective identifier of a plurality of identifiers; and
select the block of memory cells based at least in part on the respective identifier associated with the block of memory cells, wherein performing the media management operation on the block is based at least in part on selecting the block.

24. The non-transitory computer-readable medium of claim 13, wherein performing the media management operation on the temporarily retired block of memory cells occurs during at least a portion of an idle duration associated with the memory system.

25. A method performed by a memory system, the method comprising:
determining an occurrence of at least one error for a block of memory cells of the memory system;
storing an index associated with the block of memory cells to a first mapping that indicates one or more temporarily retired blocks of memory cells of the memory system;
performing a media management operation on the block of memory cells based at least in part on storing the index to the first mapping;
determining whether to retire the block or enable the block based at least in part on performing the media management operation on the block of memory cells associated with the index that is stored to the first mapping that indicates the one or more temporarily retired blocks of memory cells of the memory system; and
transferring the index to a different mapping based at least in part on determining whether to retire or enable the block.

\* \* \* \* \*